United States Patent [19]
Aerens et al.

[11] Patent Number: 5,649,267
[45] Date of Patent: Jul. 15, 1997

[54] METHOD OF FORMING A DRUM ASSEMBLY FOR USE IN A PRINTER AND THE DRUM ASSEMBLY MADE THEREBY

[75] Inventors: Ronny Jean Valentine Aerens, Belsele; Etienne Marie De Cock; Lucien Amede De Schamphelaere, both of Edegem; Peter Alexander Roger Steylaerts, Lier; Erik Gabriel Gerardus Van Weverberg, Mortsel, all of Belgium

[73] Assignee: Xeikon N.V., Mortsel, Belgium

[21] Appl. No.: 554,513

[22] Filed: Nov. 7, 1995

Related U.S. Application Data

[62] Division of Ser. No. 257,111, Jun. 8, 1994, Pat. No. 5,499,093.

[30] Foreign Application Priority Data

Jun. 18, 1993 [EP] European Pat. Off. ............. 93304773

[51] Int. Cl.⁶ .................................................. G03G 21/00
[52] U.S. Cl. .................................... 399/159; 492/46
[58] Field of Search .............................. 355/211, 212, 355/213; 492/21, 45, 46, 47

[56] References Cited

U.S. PATENT DOCUMENTS

| 4,386,839 | 6/1983 | Kumagai et al. | 492/47 X |
| 4,754,537 | 7/1988 | Lee | 492/47 X |
| 4,839,690 | 6/1989 | Onoda et al. | 355/211 |
| 4,975,744 | 12/1990 | Ebata et al. | 355/211 |
| 5,052,090 | 10/1991 | Kitaura et al. | 355/211 X |
| 5,469,619 | 11/1995 | Renck | 492/47 X |

*Primary Examiner*—Fred L. Braun
*Attorney, Agent, or Firm*—Brumbaugh, Graves, Donohue & Raymond

[57] ABSTRACT

A method of forming a drum assembly for use as a rotatable endless surface onto which a toner image is formed. The drum assembly has a hollow drum with an opening at each end and a surface onto which the image is formed. A support flange, having an aperture in the center thereof, is cooled before being inserted into each end opening. The drum assembly also includes a shaft having a collar fixed in the vicinity of each end. After the shaft is positioned inside the drum, the collars are positioned to coincide with the flange apertures. Screws secure each collar to its respective flange. The screws can be adjusted to reduce the eccentricity of the drum.

12 Claims, 13 Drawing Sheets

METHOD OF FORMING A DRUM ASSEMBLY FOR USE IN A PRINTER AND THE DRUM ASSEMBLY MADE THEREBY

This is a divisional application of allowed application Ser. No. 08/257,111 filed Jun. 8, 1994, U.S. Pat. No. 5,499,093.

FIELD OF THE INVENTION

This invention relates to an electrostatographic single-pass multiple station (for example multi-colour) printer, in particular such a printer as is capable of printing colour images for professional purposes as a cost effective alternative to conventional printing of short to medium sized runs.

BACKGROUND TO THE INVENTION

Electrostatographic printing operates according to the principles and embodiments of non-impact printing as described, eg, in "Principles of Non-Impact Printing" by Jerome L Johnson (1986)—Palatino Press—Irvine Calif., 92715 USA).

Electrostatographic printing includes electrographic printing in which an electrostatic charge is deposited image-wise on a dielectric recording member as well as electrophotographic printing in which an overall electrostatically charged photoconductive dielectric recording member is image-wise exposed to conductivity increasing radiation producing thereby a "direct" or "reversal" toner-developable charge pattern on said recording member. Magnetic brush development is suited for "direct" as well as "reversal" development. "Direct" development is a positive-positive development, and is particularly useful for reproducing pictures rather than text. "Reversal" development is of interest in or when from a negative original a positive reproduction has to be made or vice-versa, or when the exposure derives from an image in digital electrical signal form, wherein the electrical signals modulate a laser beam or the light output of light-emitting diodes (LEDs). It is advantageous with respect to a reduced load of the electric signal modulated light source (laser or LEDs) to record graphic information (eg printed text) in such a way that the light information corresponds with the graphic characters so that by "reversal" development in the exposed area of a photoconductive recording layer, toner can be deposited to produce a positive reproduction of the electronically stored original. In high speed electrostatographic printing the exposure derives practically always from electronically stored, ie computer stored, information.

As used herein, the term "electrostatographic" also includes the direct image-wise application of electrostatic charges on an insulating support, for example by ionography.

The toner image obtained on a repeatedly used electrostatographic dielectric recording member is transferred onto a printing stock material, usually paper, in the form of a web whereon the toner image is fixed, whereupon the web is usually cut into sheets containing the desired print frame.

The printing device according to the invention is particularly concerned with the image formation, developing, transfer and fixing of multi-colour images on a travelling web, whereby utmost care has to be taken that the selection images, which make up said multi-colour image overlap each other according to very close tolerances. Misregistering or too large tolerances could give rise to small colour stripes becoming visible or to the creation of a moiré-pattern, whereby a low frequency interference pattern originates on or in the final multi-colour image.

The problem of transferring selection images in register towards a travelling web is well known in the art.

In graphic arts, with gravure, offset and flexography being the dominant printing techniques, and wherein either a printing plate is positioned on a printing cylinder or the printing cylinder itself has an image pattern etched into its surface, use is made of so-called register marks which are printed on the image-receiving web to be printed upon. In the course of printing those register marks are generally optically detected and the detected signal is sent to a circuit controlling a servomotor which is capable of acting upon a differential gear system forming part of the printing cylinder and by means of which small relative movements of the printing plate relative to the circumferential surface of the printing roller may be made for correction of register.

In British patent application GB-A-2195856 (Matsushita), there is described a sensing device for sensing marks formed on a moving web in order to ensure correct registration. In U.S. Pat. No. 4,912,491 (Hoshino et al. assigned to Canon KK) there is described another apparatus which utilises registration marks formed on the image transferring medium. The registration mark is formed on a transparent part of the medium. Another disclosure of an apparatus utilising registration marks on the image-receiving member is U.S. Pat. No. 5,160,946 (Hwang assigned to Xerox Corporation).

A disadvantage of the use of sensing marks on the moving web is that their presence on the final product is unacceptable, which means that steps have to be taken for their removal, for example by deletion or by cutting of the web.

SUMMARY OF THE INVENTION

It is therefore an object of the invention to provide a multi-colour printing device by means of which the stages going from image formation to transfer in register and fixing may be carried out continuously and a high operating speed can be attained, needing neither printed register marks on the web nor complex electromechanical drive systems.

According to the invention there is provided an electrostatographic single-pass multiple station printer for forming images onto a web, which comprises:

(i) a plurality of toner image-printing electrostatographic stations (also referred to herein as "image-writing" stations) each having
  (ia) rotatable endless surface means onto which a toner image can be formed;
  (ib) means for line-wise forming an electrostatic toner image on each said surface means; and
  (ic) means for transferring the toner image onto the web;
(ii) means for conveying the web in succession past said stations in synchronism with the peripheral speed of said rotatable endless surface means; and
(iii) register control means for controlling the operation of each of said stations in timed relationship thereby to obtain correct registering of the distinct toner images on the web; wherein said register control means comprises
  (iiia) encoder means for producing pulses indicative of web displacement, and
  (iiib) delay means for initiating the operation of subsequent image-printing stations after a predetermined web displacement, as measured by the encoder means, has occurred.

According to a preferred embodiment, said means for line-wise forming an electrostatic toner image on each said surface means are, when operative, synchronised to the pulses produced by said encoder means.

The invention enables accurate registration of the transferred images irrespective of the speed of the web, and its variations, through the printer.

According to a preferred embodiment, the synchronous movement coupling of said web with said rotatable endless surface means proceeds by adherent contact of the web with the endless surface means so that the peripheral speed of the endless surface means is controlled by the movement of the web. Such an arrangement reduces the possibility of slippage between the endless surface means and the web, thereby aiding accurate registering of images and offering overall reduction of system complexity.

By stating that the adherent contact of the web with the endless surface means controls the peripheral speed of said surface means, we mean that the only rotational torque, or substantially the only rotational torque, which is applied to the endless surface means is derived from the adherent contact between the web and the endless surface means. As explained further below, since no other, or substantially no other, resultant force is acting upon the endless surface means, the endless surface means is constrained to rotate in synchronism with the web. Slippage between the endless surface means and the web is thereby eliminated.

Preferably, the transfer means is a corona discharge device providing electrostatic adhesion between the web and the endless surface means.

Usually, the rotatable endless surface means comprises a belt or the circumferential surface of a drum, especially a belt or drum which has a photoconductive surface. In the following general description, reference is made to a drum, but it is to be understood that such references are also applicable to endless belts or to any other form of endless surface means. Each toner image-printing electrostatographic station preferably comprises means for charging the surface of the drum, and usually the surface of the drums at all the image-printing stations are charged to the same polarity. Using photoconductors of the organic type, it is most convenient to charge the surface of the drums to a negative polarity and to develop the latent image formed thereon in reversal development mode by the use of a negatively charged toner.

The means for image-wise exposing the charged surface of the drum or belt may comprise an array of image-wise modulated light-emitting diodes or be in the form of a scanning laser beam.

The toner will usually be in dry-particle form, but the invention is equally applicable where the toner particles are present as a dispersion in a liquid carrier medium or in a gas medium in the form of an aerosol.

It is convenient for each image-printing station to comprise a driven rotatable magnetic developing brush and a driven rotatable cleaning brush, both in frictional contact with the drum surface. We have found that by arranging for the developing brush and the cleaning brush to rotate in mutually opposite directions, it can be assured that the resultant torque applied by the brushes to the drum surface is at least partly cancelled out. In particular, we prefer that the extents of frictional contact of the developing brush and of the cleaning brush with the drum surface are such that the resultant torque transmitted to the drum surface is substantially zero. By stating that the resultant torque transmitted to the drum surface is substantially zero is meant that any resultant torque acting upon the drum surface is smaller than the torque applied by the web to the drum surface.

To achieve this in a practical manner, the position and/or the speed of at least one of said brushes relative to the drum surface may be adjustable thereby to adjust the extent of frictional contact between that brush and the drum surface.

Preferably, the encoder means for use according to the invention comprises an encoder device in the form of a rotating disc. Said disc is preferably driven by the rotation of the drum at one of the image-printing stations. This arrangement ensures that the encoder pulses are indicative of web displacement, provided that there is no slippage between the web and the drum, nor between the drum and encoder disc. There are a number of embodiments of the invention whereby this can be achieved.

In a first embodiment, the drum is secured to a rotatable shaft and the encoder means comprises an encoder disc secured to the shaft. Such a shaft-mounted encoder is described in, eg, U.S. Pat. No. 5,119,128 (Cherian assigned to Xerox Corporation). The encoder disc carries a number of marks thereon which are detected by a sensing means, which may be optically or magnetically stimulated. However, in a preferred embodiment, the encoder means comprises a plurality of spaced markings formed on the drum.

The encoder means preferably further comprises multiplier means for multiplying the frequency of the produced pulses by a whole number (m), such that a unit web displacement, $\rho$, (basic web displacement) that generates a single pulse at the output of the multiplier means, is n times smaller (n being a whole number) than the line distance d, being the distance measured from the centre of one printed line to the centre of a subsequently printed line, so that:

$\rho = d/n$.

This arrangement improves the resolution of registration, reduces cost and eases manufacturing of the encoder means. To achieve a preferred small unit web displacement $\rho$ without the use of multiplier means would otherwise require the use of a high resolution encoder, placing great demands upon the encoder sensing means, in particular the accuracy of associated optics. However by reducing the number of encoder marks formed on, or carried by, the drum to too small a number, and utilising a correspondingly large multiplication factor, any deviations from regular rotational speed of the drum will be less likely to be detected. We therefore prefer that the number of encoder marks corresponds to 5 to 100 marks per cm of web displacement, operating with a line distance of 40 m, and a corresponding multiplication factor m of from 5 to 100. Preferably, the pulse frequency $f_E$ at the output of the multiplier means, is at least four times higher than the line frequency $f_D$.

Preferably, the multiplier means further comprises filter means to remove high frequency variations in the signal from the encoder means caused not by speed variations but by vibrations in the printer.

Therefore, the multiplier means preferably comprises a phase comparator, a filter and a voltage controlled oscillator. The time constant of the (low pass) filter defines the cut-off frequency of the multiplier means and may lie within the range of 5 to 40 Hz, such as about 10 Hz.

The multiplier means may comprise a phase-locked loop circuit with a phase comparator for comparing the phase of the signal from the encoder means with the phase of a signal resulting from the division by a whole number m of the frequency of the output signal of a voltage controlled oscillator. The phase difference between the compared signals, after passing the low pass filter, controls the voltage controlled oscillator, while the output signal of the voltage controlled oscillator controls the delay means.

Preferably, the register control means further comprises adjustment means for adjusting the delay means, in response to deviations of the image register as a consequence of deviations of web displacement between two positions of image transfer. These adjustment means may comprise means to measure the actual mis-registration and means to calculate from these measurements a new series of parameters characterising the delay means.

Preferably, the encoder means is associated with a central one of the image-printing stations, that is, not with the first or with the last of the image-printing stations but rather with an intermediate station, in particular with the central, or the closest to central, station. When the printer is a colour printer comprising image-printing stations for each of yellow, magenta, cyan and black toner images, the black, cyan and magenta image-printing stations being sequentially ordered and the central (magenta) one carries the encoder means.

Although encoder means are well known and widely used, it is still considered difficult to produce adequately precise encoders at reasonable cost. Particularly, the accuracy of encoder means comprising a rotating disc will depend largely on the eccentricity of the disc as mounted on a shaft or drum flange. In addition, almost any type of encoder will produce inaccurate readings when the means used to produce the encoder pulses (for example the marks of an optical encoder) are inaccurately positioned or show defects such as notches or protuberances, such as those caused by dirt. Any of such errors of a recurrent nature will cause the encoder pulses to reflect a faulty indication of the web displacement and consequently will cause mis-registration. The encoder means therefore preferably include encoder correction means that correct the faults introduced by the said inaccurate readings.

Independent of the nature of said errors, each of them results in the fact that the encoder sensor outputs a pulse frequency $f_s$, and thus a pulse period $T_s = 1/f_s$, that is not in correct correspondence with the displacement of the web. Therefore, in a preferred embodiment of the encoder correction means, there is provided means to correct said pulse period. Considering the fact that the web speed is more or less constant, correction of the period of the encoder sensor pulses is preferably established by increasing or decreasing the period of each of the individual pulses by a certain time equalling the time such period differs from the average period time.

Any errors of a recurrent nature, due to inaccuracies in the encoder can be minimised where the time taken for the web to advance from one image printing station to the next is equal to, or is a whole number multiple of, the time taken for one complete revolution of the encoder. Thus according to a preferred embodiment of the invention, the encoder means is a rotational encoder device, such as an encoder disc, and the image printing stations are substantially equally spaced as measured along the web path, the arrangement being such that the time taken for the web to advance from the transfer means of one image-producing station to the transfer means of the next image-producing station is equal to, or is a whole number multiple of the time taken for one complete revolution of the encoder device. Mostly we prefer that the spacings between successive image-producing stations, as measured along the web path, are equal to an accuracy of ±5%, most preferably ±1%. With such a construction, there will be substantially no mis-registration arising, for example, from the eccentricity of the mounting of the encoder disc on a shaft or flange of the drum.

Preferably, the means for image-wise exposing the charged surface of the drum comprises an array of image-wise modulated light-emitting diodes, although lasers, liquid crystal devices, light switching arrays or electroluminescent arrays may be used for the same purpose.

In one embodiment of the invention, the web is a final support for the toner images and is unwound from a roll, fixing means being provided for fixing the transferred images on the web. In this embodiment, the printer may further comprise a roll stand for unwinding a roll of web to be printed in the printer, and a web cutter for cutting the printed web into sheets. The drive means for the web may comprise one or more drive rollers, preferably at least one drive roller being positioned downstream of the image-printing stations and a brake or at least one drive roller being positioned upstream of the image forming stations. The speed of the web through the printer and the tension therein is dependent upon the torque and the speed applied by these drive rollers.

For example, one may provide two motor driven drive rollers, one driven at a constant speed defining the web speed and the other driven at constant torque defining the web tension. Preferably the web is conveyed through the printer at a speed of from 5 cm/sec to 50 cm/sec and the tension in the web at each image-producing station preferably lies within the range of from 0.2 to 2.0 N/cm web width.

In an alternative embodiment of the invention, the web is a temporary support in the form of a tensioned endless belt, and the printer further comprises transfer means for transferring the images formed on the belt onto a final support, fixing means being provided for fixing the transferred images on the final support. In this embodiment, the final support may be in web or sheet form.

The guide roller means may be a freely rotating roller positioned to define a wrapping angle ω, preferably of from 50° to 30°, preferably from 10° to 20°. The guide roller means preferably contacts the web on the side thereof opposite to that on which the toner images are transferred. As a possible embodiment, the image-printing stations are so disposed in relationship to one another that they are arranged along the arc of a circle. However, such an arrangement is more complicated to construct and we therefore prefer an arrangement in which image-printing stations are disposed substantially in a straight line.

The transfer means may be in the form of a corona discharge device, which sprays charged particles having a charge opposite to that of the toner particles. The supply current fed to the corona discharge device is preferably within the range of 1 to 10 μA/cm web width, most preferably from 2 to 5 μA/cm web width, depending upon the paper characteristics and will be positioned at a distance of from 3 mm to 10 mm from the path of the web.

It is possible for the stations to be arranged in two sub-groups, one sub-group forming an image on one web side and the other sub-group forming an image on the other web side, thereby to enable duplex printing. In one such arrangement, the stations are arranged in two sub-groups that are passed in succession by the moving web, thereby to enable sequential duplex printing. To enable this to be achieved, the printer may further comprise at least one idler roller for reversing the direction of web travel between the sub-groups. This enables the web to be fed from the first sub-group of stations to the second sub-group of stations. If in such an arrangement, the web would pass over direction-reversing rollers in such a manner that the side of the web carrying the image transferred in the first sub-group of stations would be in contact with the surface of the direction-reversing rollers, it would be of advantage to position a first image-fixing station between the sub-groups of stations to fix the first formed image before such contact occurs.

In a floor space-saving arrangement, the stations of the sub-groups are arranged in a substantially mutually parallel configuration and in particular the stations of each sub-group are arranged in a substantially vertical configuration.

In a preferred embodiment of the invention, the stations are arranged in two sub-groups, the rotatable endless surface means of one sub-group forming the guide roller means for the other sub-group, and vice-versa, thereby to enable simultaneous duplex printing. In such an embodiment, image(s) are transferred to a first side of the web by one or more image-printing stations, image(s) are then transferred to the opposite side of the web by one or more further image-printing stations and thereafter further image(s) are formed on the first side of the web again by one or more still further image-printing stations. Such an arrangement is referred to as a "staggered" arrangement and the most preferred embodiment of a staggered arrangement is where the image-printing stations are located one by one alternately on opposite sides of the web.

The printer construction according to the invention is particularly advantageous where the printer is a multi-colour printer comprising magenta, cyan, yellow and black printing stations.

PREFERRED EMBODIMENTS OF THE INVENTION

The invention will now be further described, purely by way of example, with reference to the accompanying drawings, in which.

Figure 9A:
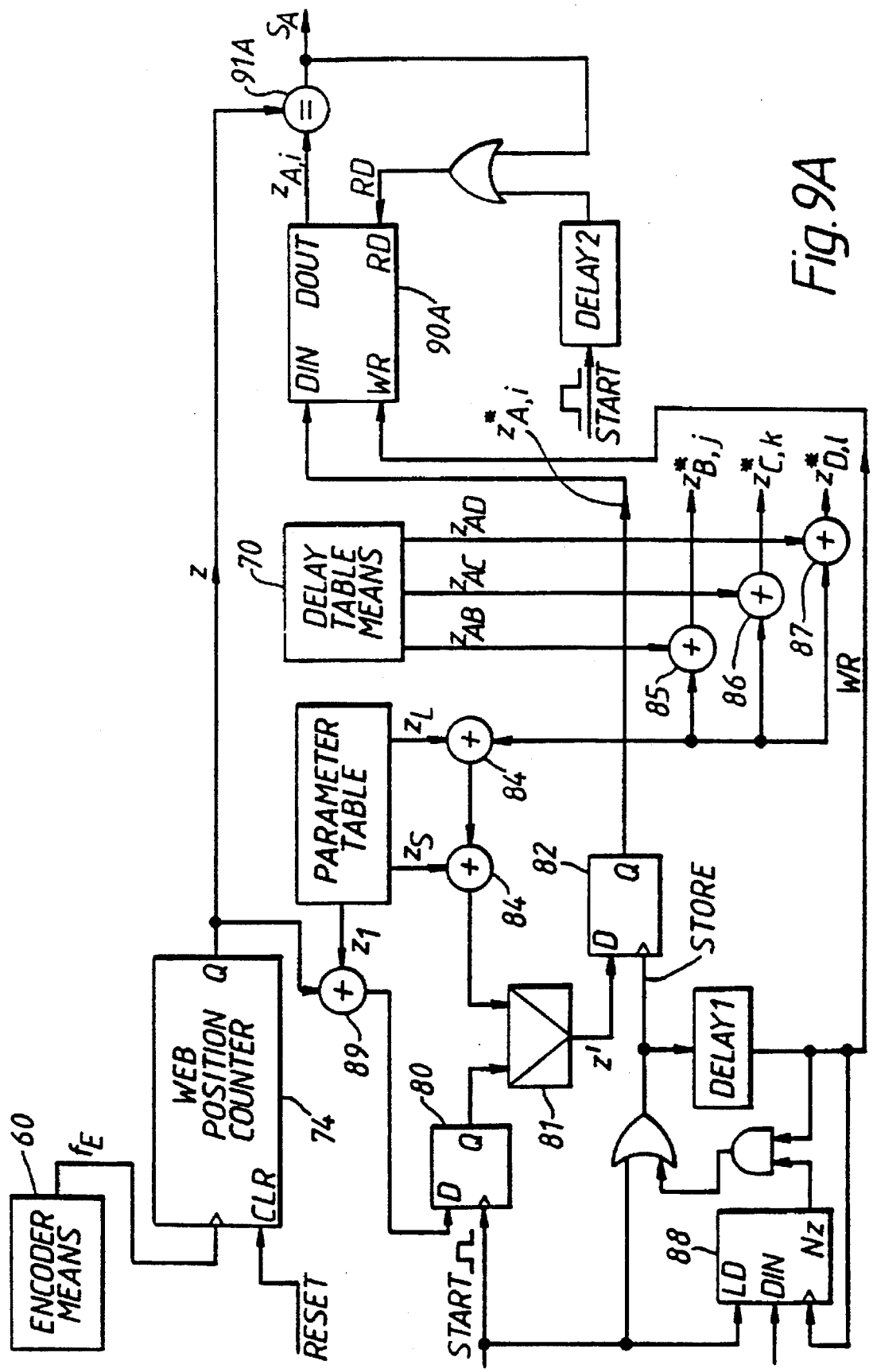
Figure 9B:
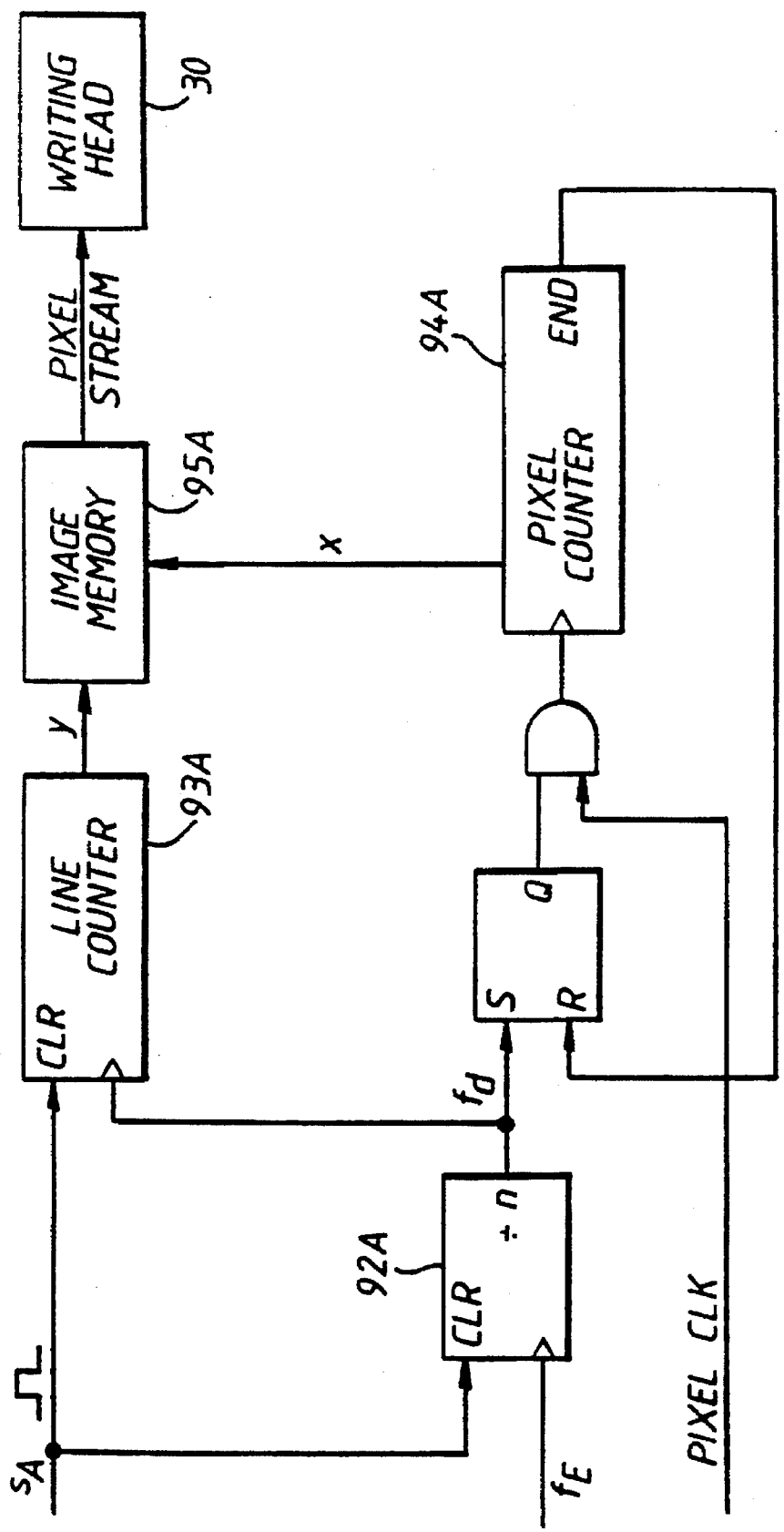
Figure 10:
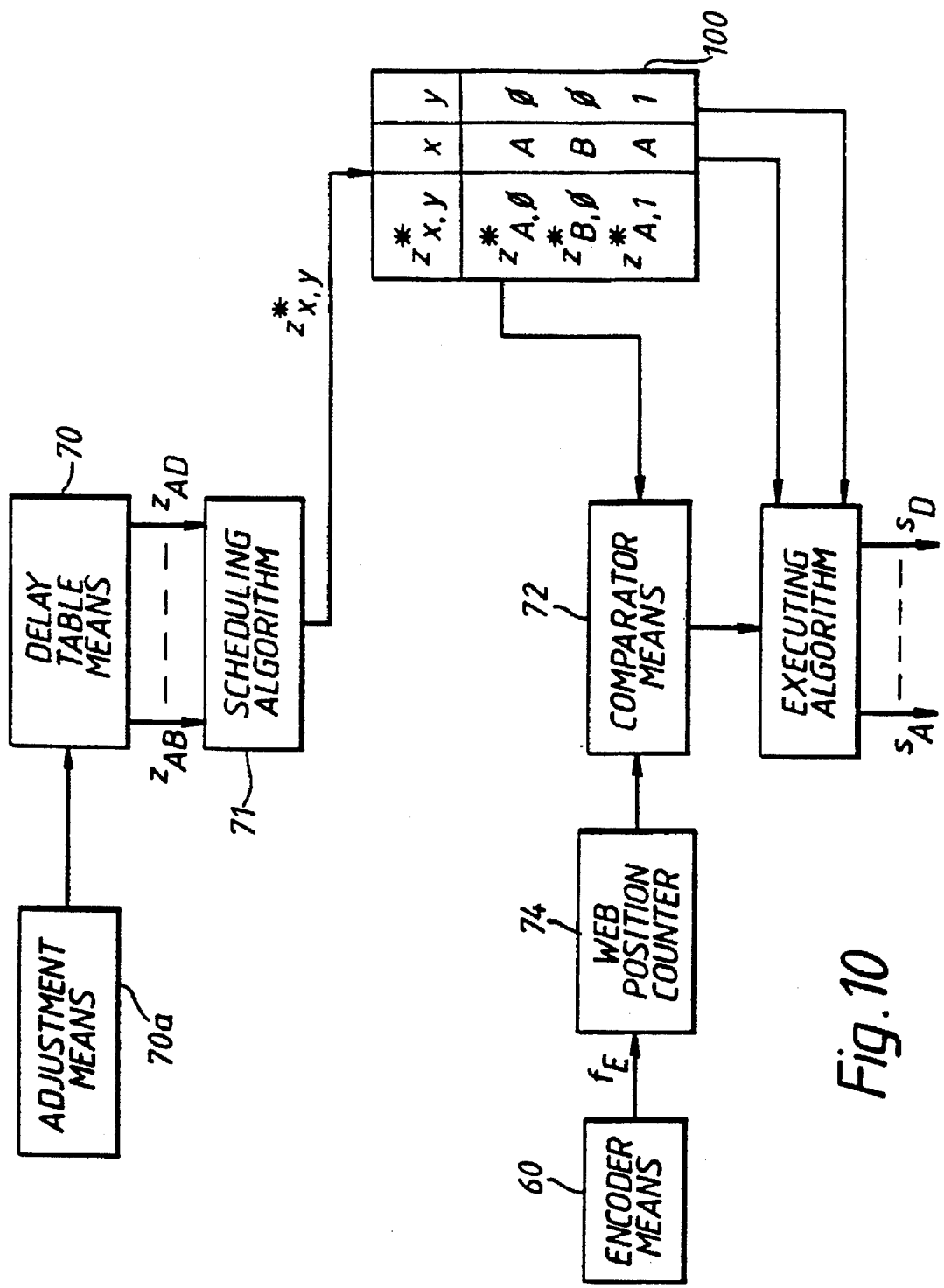
Figure 11:
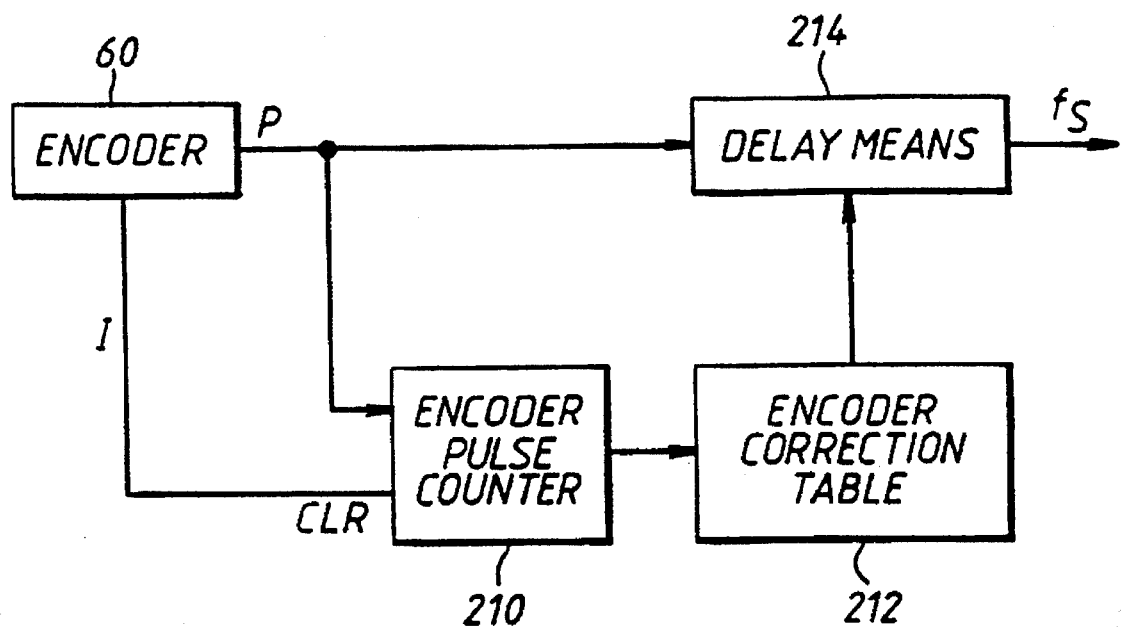
Figure 12:
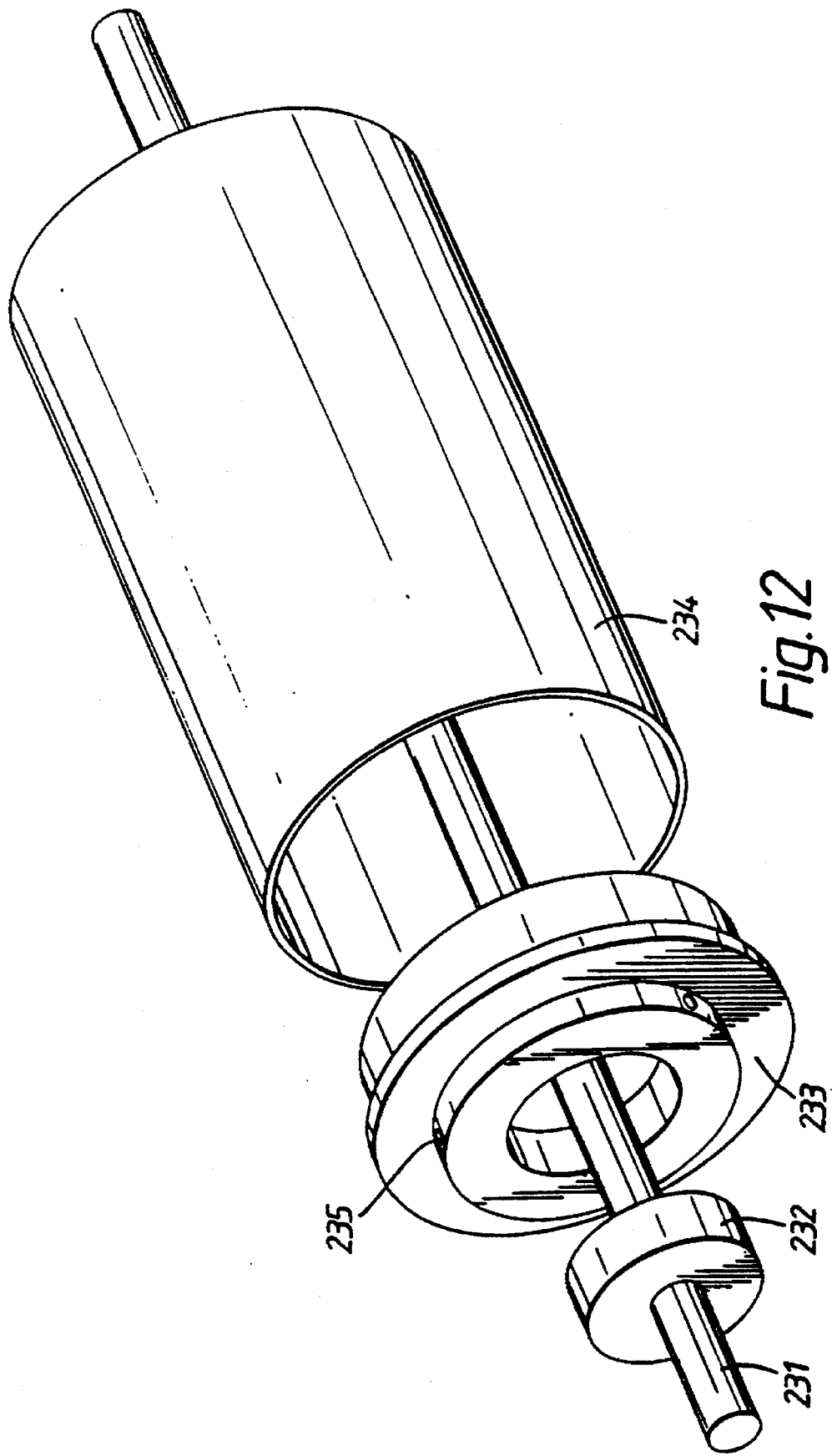

FIGS. 9A and 9B show in detail one embodiment of the control circuit for controlling the registration of images in a printer according to the invention, wherein FIG. 9A shows the offset table, scheduler, encoder and web position counter; and FIG. 9B shows the means for endless surface means of station A; line-wise forming an electrostatic toner image on the FIG. 10 shows an alternative embodiment of a control circuit for controlling the registration of images in a printer according to the invention;

FIG. 11 shows a schematic arrangement of a preferred embodiment of the encoder correction means;

FIG. 12 shows an exploded view of a drum assembly for use in a printer according to the invention.

In the description which follows, the formation of images by the "reversal" development mode is described. One skilled in the art will appreciate however, that the same principles can be applied to "direct" development mode image forming.

Figure 1:
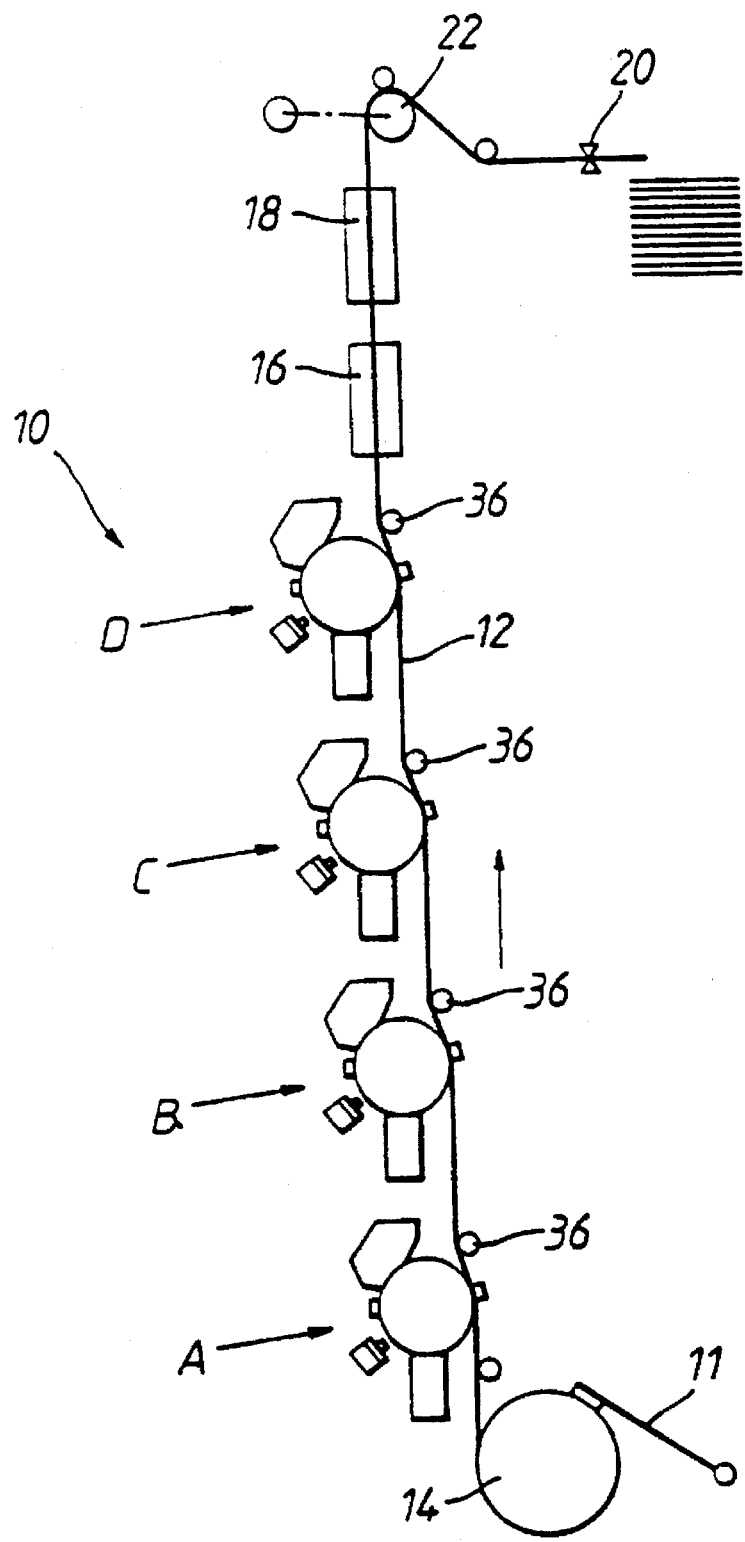
FIG. 1 shows schematically an electrostatographic single-pass multiple station printer according to the invention, suitable for simplex printing.

The printer 10 in FIG. 1 comprises 4 printing stations, A, B, C and D which are arranged to print yellow, magenta, cyan and black images respectively.

The printing stations A, B, C and D are arranged in a substantially vertical configuration, although it is of course possible to arrange the stations in a horizontal or other configuration. A web of paper 12 unwound from a supply roller 14 is conveyed in an upwards direction past the printing stations in turn. The moving web 12 is in face-to-face contact with the drum surface 26 (see FIG. 2) over a wrapping angle ω of about 15° determined by the position of guide rollers 36. After passing the last printing station D, the web of paper 12 passes through an image-fixing station 16, an optional cooling zone 18 and thence to a cutting station 20. The web 12 is conveyed through the printer by a motor-driven drive roller 22 and tension in the web is generated by the application of a brake 11 acting upon the supply roller 14.

Figure 2:
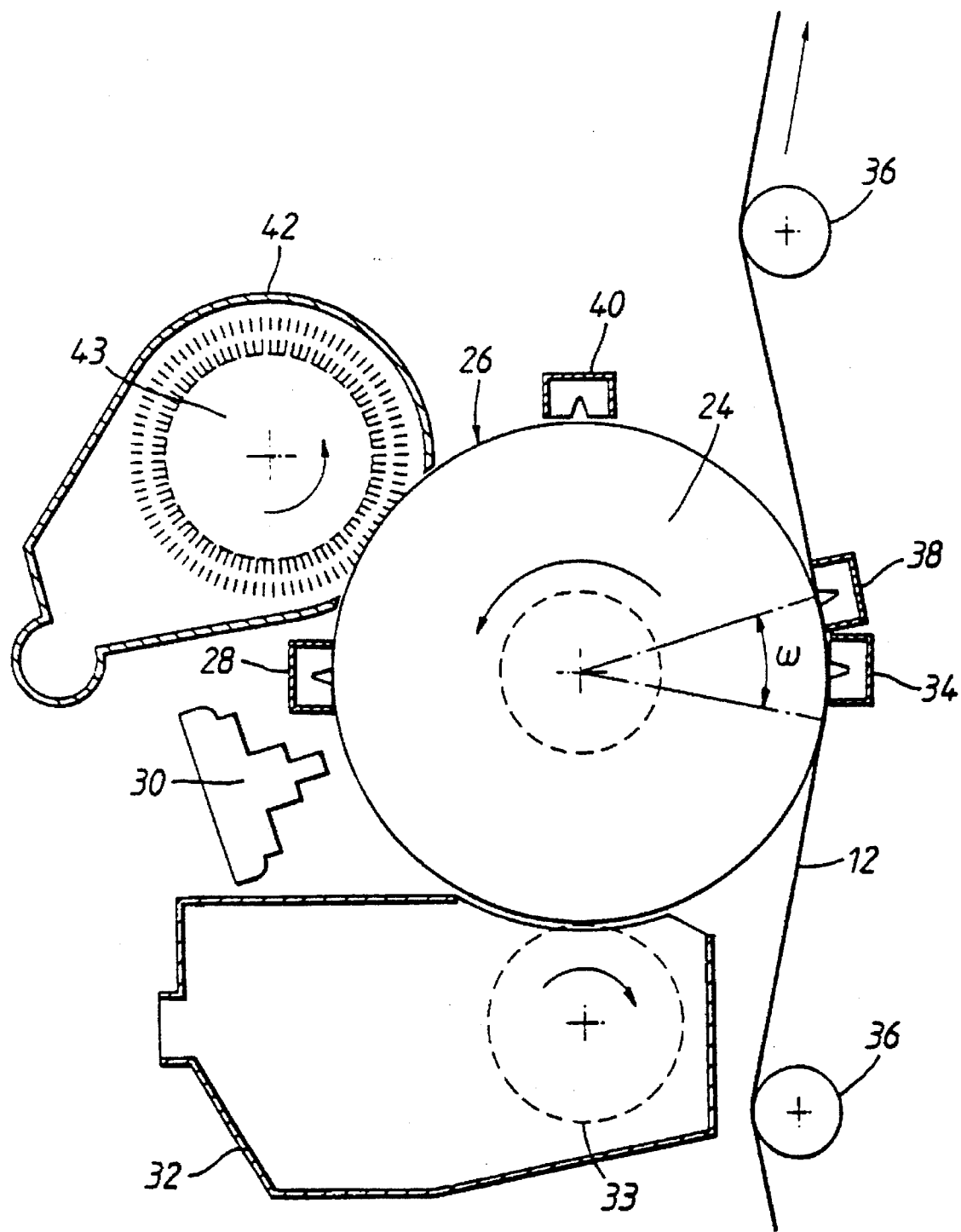
FIG. 2 shows in detail a cross-section of one of the print stations of the printer shown in FIG. 1.

As shown in FIG. 2, each printing station comprises a cylindrical drum 24 having a photoconductive outer surface 26. Circumferentially arranged around the drum 24 there is a main corotron or scorotron charging device 28 capable of uniformly charging the drum surface 26, for example to a potential of about −600 V, an exposure station 30 which may, for example, be in the form of a scanning laser beam or an LED array, which will image-wise and line-wise expose the photoconductive drum surface 26 causing the charge on the latter to be selectively reduced, for example to a potential of about −250 V, leaving an image-wise distribution of electric charge to remain on the drum surface 26. This so-called "latent image" is rendered visible by a developing station 32 which by means known in the art will bring a developer in contact with the drum surface 26. The developing station 32 includes a developer drum 33 which is adjustably mounted, enabling it to be moved radially towards or away from the drum 24 for reasons as will be explained further below. According to one embodiment, the developer contains (i) toner particles containing a mixture of a resin, a dye or pigment of the appropriate colour and normally a charge-controlling compound giving triboelectric charge to the toner, and (ii) carrier particles charging the toner particles by frictional contact therewith. The carrier particles may be made of a magnetizable material, such as iron or iron oxide. In a typical construction of a developer station, the developer drum 33 contains magnets carried within a rotating sleeve causing the mixture of toner and magnetizable material to rotate therewith, to contact the surface 26 of the drum 24 in a brush-like manner. Negatively charged toner particles, triboelectrically charged to a level of, for example 9 μC/g, are attracted to the photo exposed areas on the drum surface 26 by the electric field between these areas and the negatively electrically biased developer so that the latent image becomes visible.

After development, the toner image adhering to the drum surface 26 is transferred to the moving web 12 by a transfer corona device 34. The moving web 12 is in face-to-face contact with the drum surface 26 over a wrapping angle ω of about 15° determined by the position of guide rollers 36. The transfer corona device 34, being on the opposite side of the web to the drum, and having a high polarity opposite in sign to that of the charge on the toner particles, attracts the toner particles away from the drum surface 26 and onto the surface of the web 12. The transfer corona device typically has its corona wire positioned about 7 mm from the housing which surrounds it and 7 mm from the paper web. A typical transfer corona current is about 3 μA/cm web width. The transfer corona device 34 also serves to generate a strong adherent force between the web 12 and the drum surface 26, causing the drum to be rotated in synchronism with the movement of the web 12 while also urging the toner particles into firm contact with the surface of the web 12. The web, however, should not tend to wrap around the drum beyond the point dictated by the positioning of a guide roller 36 and there is therefore provided circumferentially beyond the transfer corona device 34 a web discharge corona device 38 driven by alternating current and serving to discharge the web 12 and thereby allow the web to become released from the drum surface 26. The web discharge corona device 38 also serves to eliminate sparking as the web leaves the surface 26 of the drum.

Thereafter, the drum surface 26 is pre-charged to a level of, for example −580 V, by a pre-charging corotron or scorotron device 40. The pre-charging makes the final charging by the corona 28 easier. Any residual toner which might still cling to the drum surface may be more easily removed by a cleaning unit 42 known in the art. The cleaning unit 42 includes an adjustably mounted cleaning brush 43, the position of which can be adjusted towards or away from the drum surface 26 to ensure optimum cleaning. The cleaning brush is earthed or subject to such a potential with respect to the drum as to attract the residual toner particles away from the drum surface. After cleaning, the drum surface is ready for another recording cycle.

After passing the first printing station A, as described above, the web passes successively to printing stations B, C and D, where images in other colours are transferred to the web.

The electrostatic adherent force between the web and the drum generated by the transfer corona device 34, the wrapping angle ω determined by the relative position of the drum 24 and the guide rollers 36, and the tension in the web generated by the drive roller 22 and the braking effect of the brake 11 are such as to ensure that the peripheral speed of the drum 24 is determined substantially only by the movement of the web 12, thereby ensuring that the drum surface moves synchronously with the web.

The cleaning unit 42 includes a rotatable cleaning brush 43 which is driven to rotate in the same sense as that of the drum 24 and at a peripheral speed of, for example twice the peripheral speed of the drum surface. The developing unit 32 includes a brush-like developer drum 33 which rotates in the opposite sense as that of the drum 24. The resultant torque applied to the drum 24 by the rotating developing brush 33 and the counter-rotating cleaning brush 43 is adjusted to be close to zero, thereby ensuring that the only torque applied to the drum is derived from the adherent force between the drum 24 and the web 12. Adjustment of this resultant force is possible by virtue of the adjustable mounting of the cleaning brush and/or the developing brush 33 and the brush characteristics.

Figure 3:
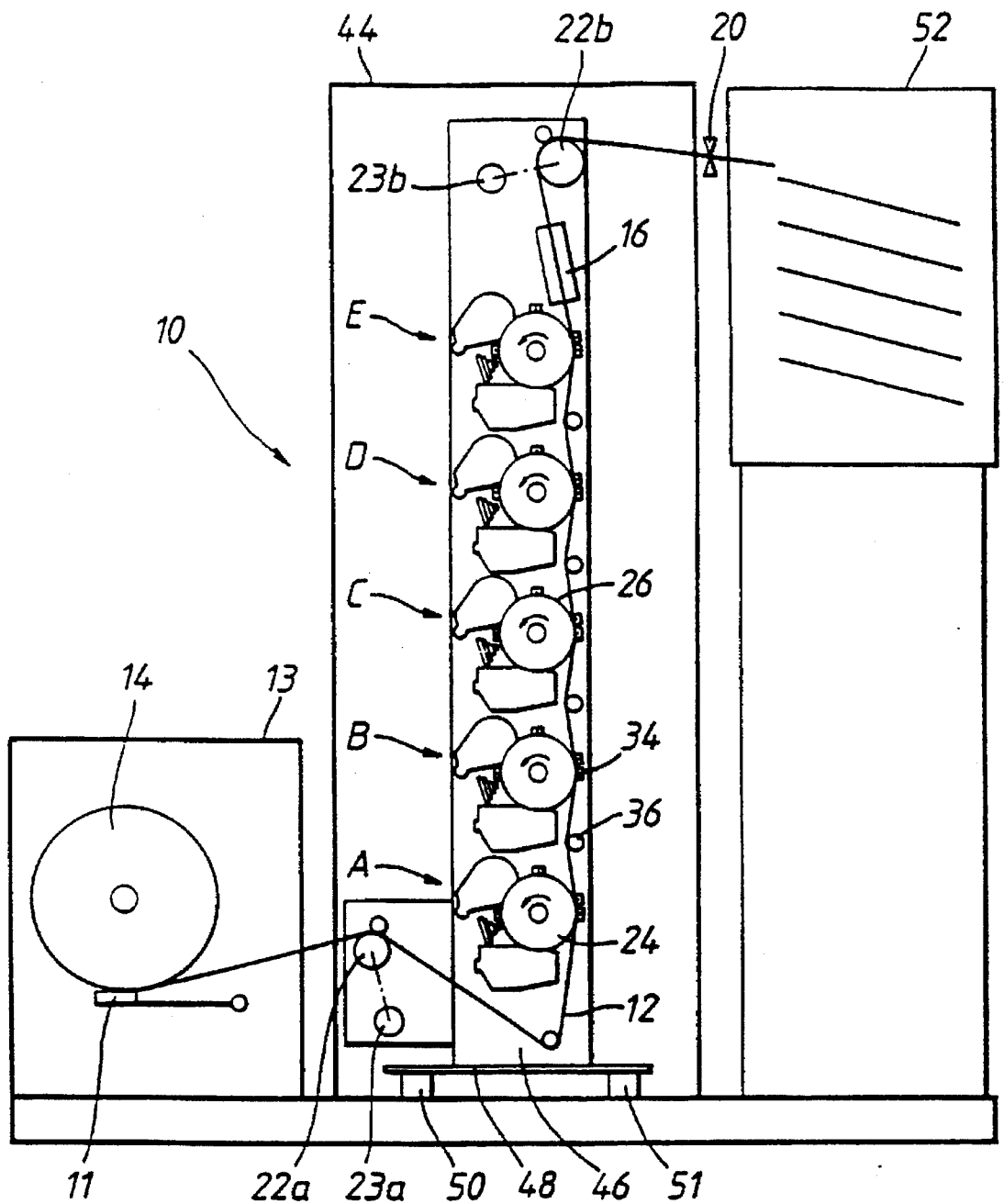
FIG. 3 shows the printer according to FIG. 1 in a less schematic representation, showing the positional relationship of the various parts thereof.

Referring to FIG. 3, there is shown a printer having a supply station 13 in which a roll 14 of web material 12 is housed, in sufficient quantity to print, say, up to 5,000 images. The web 12 is conveyed into a tower-like printer housing 44 in which a support column 46 is provided, housing four similar printing stations A to D. In addition, a further station E is provided in order to optionally print an additional colour, for example a specially customised colour. The printing stations A to E are mounted in a substantially vertical configuration resulting in a reduced footprint of the printer and additionally making servicing easier. The column 46 may be mounted against vibrations by means of a platform 48 resting on springs 50, 51.

After leaving the final printing station E, the image on the web is fixed by means of the image-fixing station 16 and fed to a cutting station 20 (schematically represented) and a stacker 52 if desired.

The web 12 is conveyed through the printer by two drive rollers 22a, 22b one positioned between the supply station 13 and the first printing station A and the second positioned between the image-fixing station 16 and the cutting station 20. The drive rollers 22a, 22b are driven by controllable motors, 23a, 23b. One of the motors 23a, 23b is speed controlled at such a rotational speed as to convey the web through the printer at the required speed, which may for example be about 125 mm/sec. The other motor is torque controlled in such a way as to generate a web tension of, for example, about 1 N/cm web width.

Figure 4:
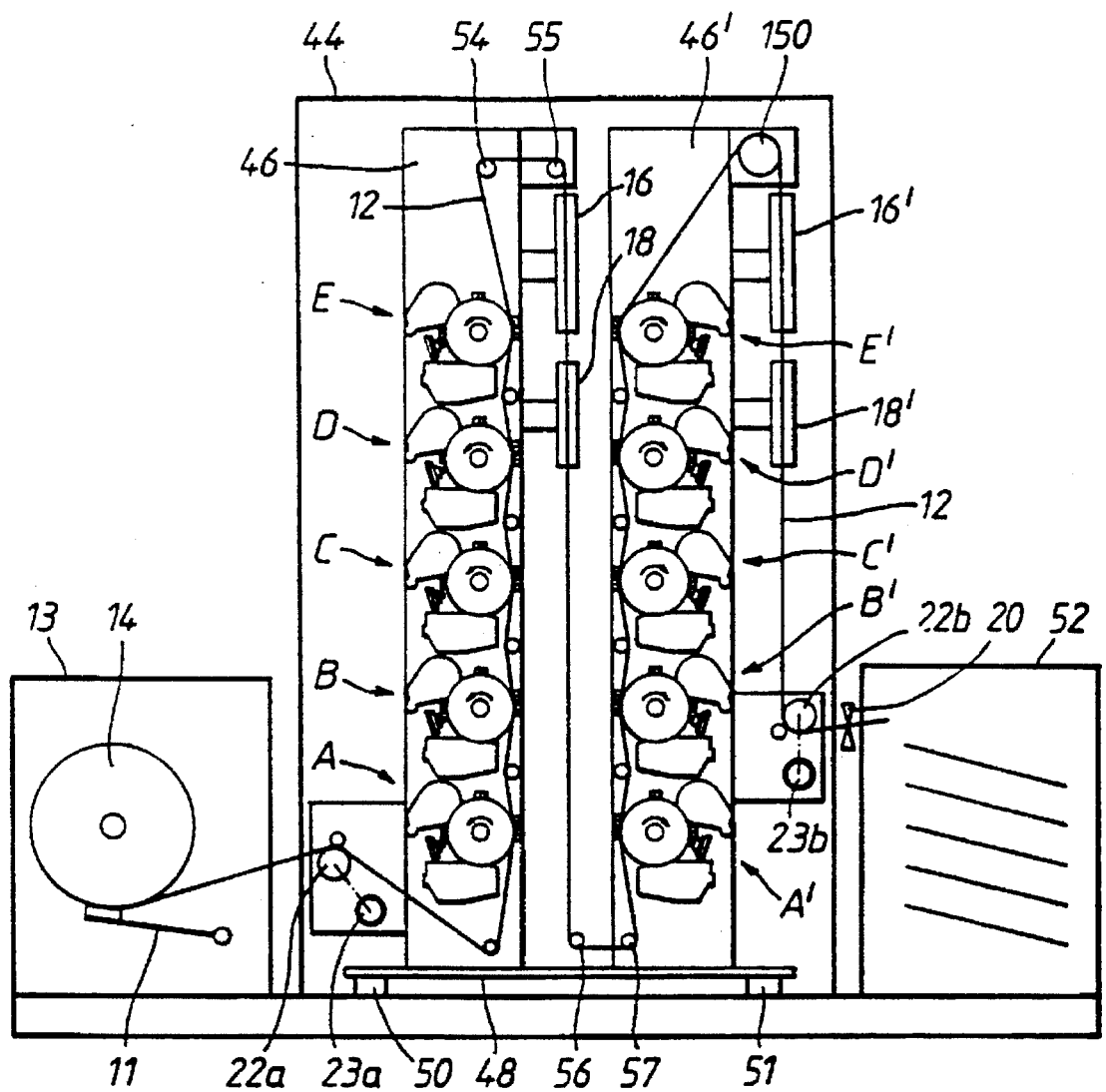
FIG. 4 shows a section of a printer according to an alternative embodiment of the invention capable of sequential duplex printing.

In FIG. 4 there is shown a duplex printer which differs from the printer shown in FIG. 3 in that there are two support columns 46 and 46', housing printing stations A to E, and A' to E' respectively.

After leaving the printing station E the web passes over upper direction-reversing rollers 54, 55 before entering the first image-fixing station 16. Towards the bottom of the printer the web 12, with a fixed image on one face, passes over lower direction-reversing rollers 56, 57 to enter the second column 46' from the bottom. The web 12 then passes the printing stations A' to E' where a second image is printed on the opposite side of the web. The second image is fixed by the image-fixing station 16'. In the particular embodiment shown in FIG. 4, all components of the printing stations are identical (except for the colour of the toner) and this gives both operating and servicing advantages.

Figure 5:
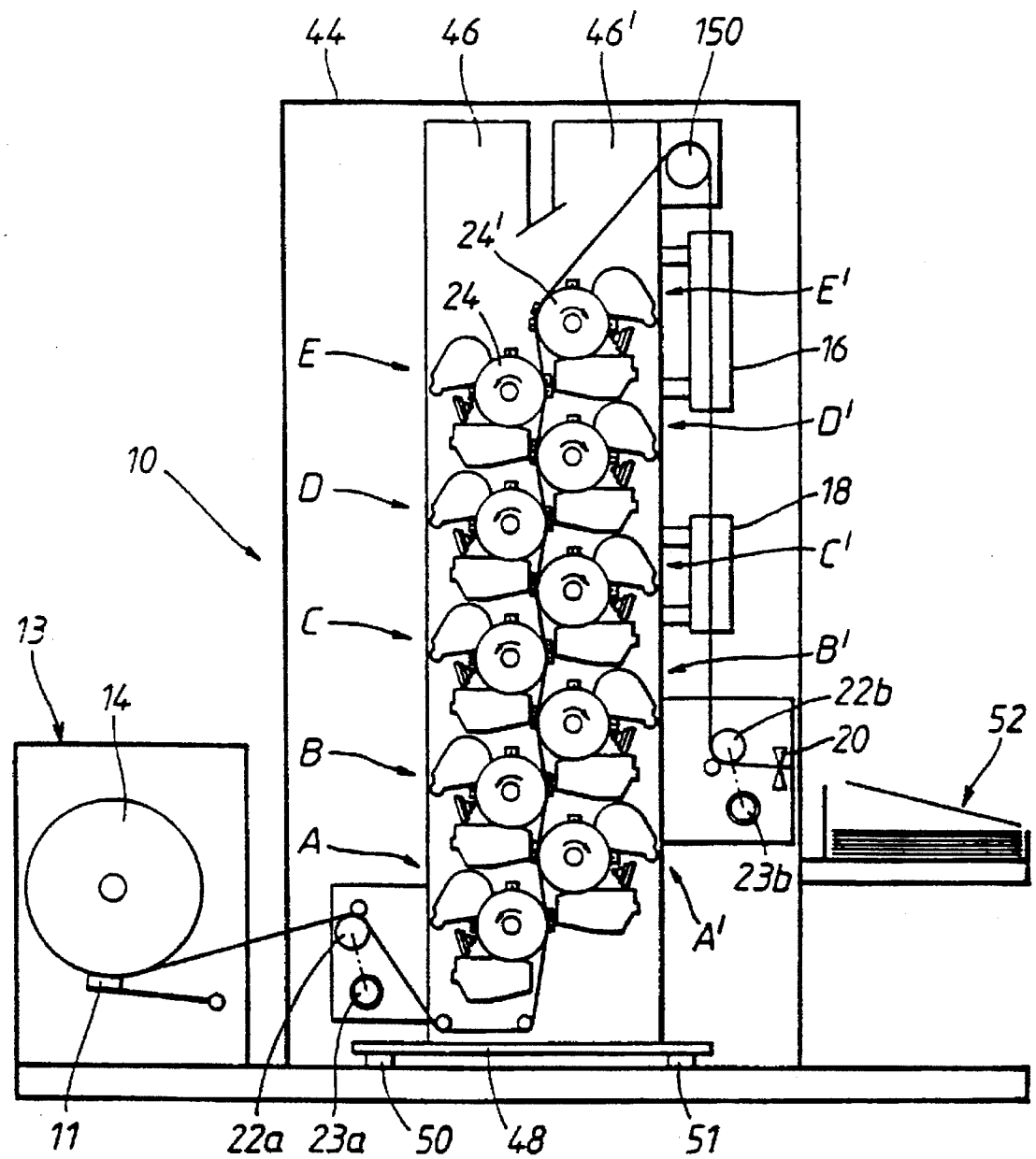
FIG. 5 shows a section of a printer according to an alternative embodiment of the invention, capable of simultaneous duplex printing.

FIG. 5 shows a more compact version of the duplex printer shown in FIG. 4. As in the case of FIG. 4, two columns 46 and 46' are provided each housing printing stations A to E and A' to E' respectively. In contradistinction to FIG. 4, the columns 46 and 46' are mounted closely together so that the web 12 travels in a generally vertical path defined by the facing surfaces of the imaging station drums 24, 24'. This arrangement is such that each imaging station drum acts as the guide roller for each adjacent drum, thus defining the wrapping angle. In the particular embodiment of FIG. 5, there is no need for an intermediate image-fixing station. The arrangement is more compact than the embodiment of FIG. 4. The paper web path through the printer is shorter and this gives advantages in reducing the amount of paper web which is wasted when starting up the printer. By avoiding the use of intermediate fixing, front-to-back registration of the printed images is made easier. Although in FIG. 5 the columns 46 and 46' are shown as being mounted on a common platform 48, it is possible in an alternative embodiment for the columns 46 and 46' to be separately mounted, such as for example being mounted on horizontally disposed rails so that the columns may be moved away from each other for servicing purposes and also so that the working distance between the columns may be adjusted.

Figure 6:
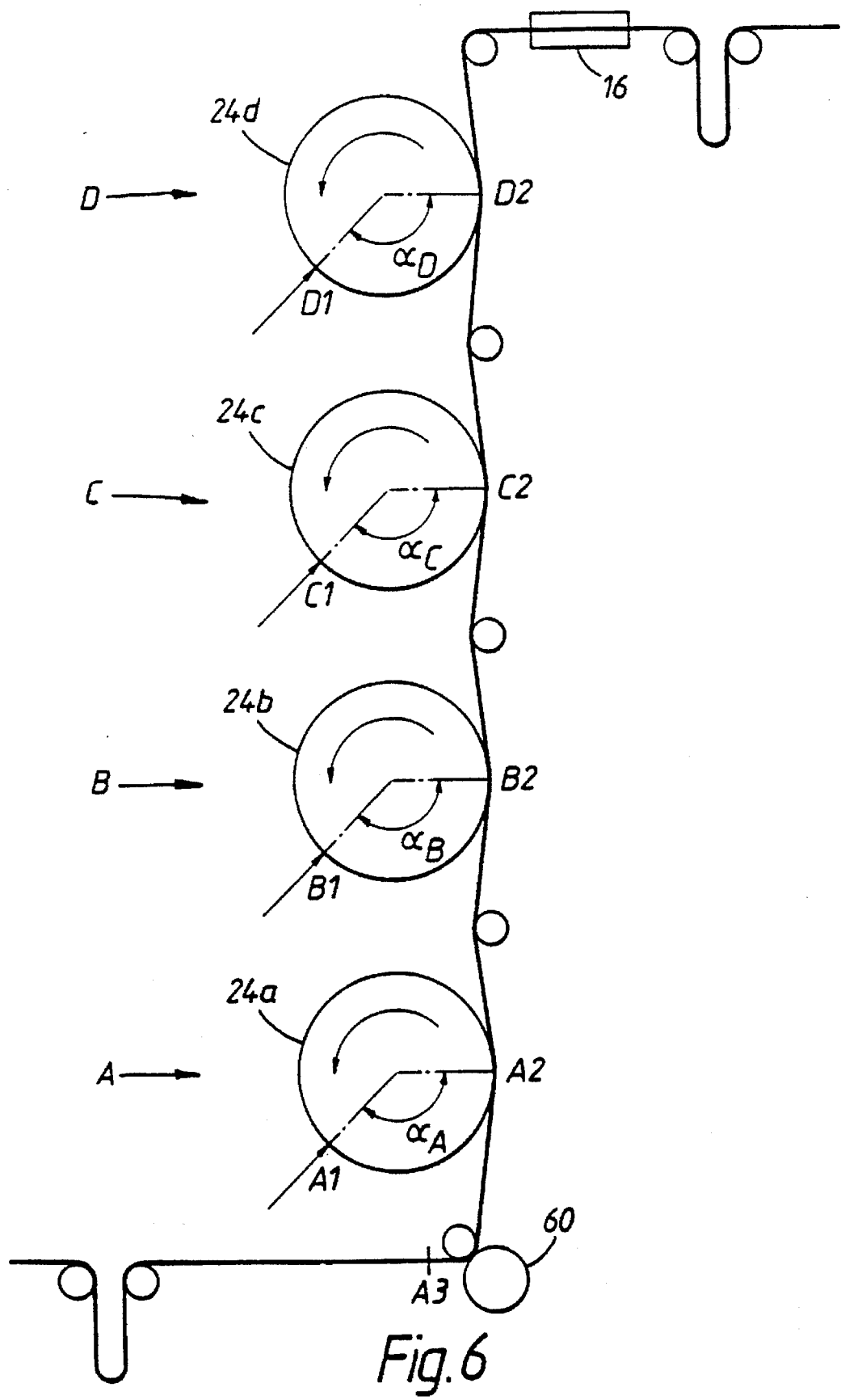
FIG. 6 shows a schematic representation of transferring images in register.

With reference to FIG. 6, and for the purpose of describing the operation of the register control means, we define:
  writing points $A_1$, $B_1$, $C_1$ and $D_1$ being the position of the writing stations of the image printing stations A, B, C and D as projected, perpendicular to the drum surface, on the drum surface;
  transfer points $A_2$, $B_2$, $C_2$ and $D_2$ being the points on the surface of drums 24a, 24b, 24c and 24d that coincide with the centre of the wrapping angle ω (see FIG. 2);

lengths $l_{A2B2}$, $l_{B2C2}$ and $l_{C2D2}$ being the lengths measured along the web between the points $A_2$ and $B_2$, $B_2$ and $C_2$ and $C_2$ and $D_2$;

lengths $l_{A1A2}$, $l_{B1B2}$, $l_{C1C2}$ and $l_{D1D2}$ being the lengths measured along the surface of the drums 24a, 24b, 24c and 24d between the points $A_1$ and $A_2$, $B_1$ and $B_2$, $C_1$ and $C_2$ and $D_1$ and $D_2$.

In order to obtain good registration, the delay between writing an image at $A_1$ and writing a related image at $B_1$, $C_1$ or $D_1$ should be equal to the time required for the web to move over a length $l_{AB}$, $l_{AC}$ or $l_{AD}$, wherein:

$l_{AB} = l_{A1A2} + l_{A2B2} - l_{B1B2}$ and consequently
$l_{AC} = l_{A1A2} + l_{A2B2} + l_{B2C2} - l_{C1C2}$ and
$l_{AD} = l_{A1A2} + l_{A2B2} + l_{B2C2} + l_{C2D2} - l_{D1D2}$ In practice the lengths $l_{A1A3}$ etc., and $l_{A2B2}$ etc. will usually be designed to be nominally identical but, due to manufacturing tolerances, minor differences may not be avoided and for the purposes of explaining the principles of registration they are assumed not to be identical.

From the above equations, one derives easily a possible cause of mis-registration, ie that when using a fixed time $t_{AB} = l_{AB}/V_{average}$ with which the imaging at point $B_1$ is delayed from the imaging at point $A_1$, while the web speed v shows variations over this period of time, the web will have travelled over a length $$l'_{AB} = \int_0^{t_{AB}} v \, dt.$$

Since it is most likely that $l'_{AB}$ does not equal $l_{AB}$, the image written at point $B_1$ will, when being transferred onto the web, not coincide with the image written at point $A_1$, thus causing mis-registration.

Let $f_E$ be the pulse frequency being generated by the encoder means 60 wherein $f_E$ equals $n.f_D$; the line frequency $f_D$ being the frequency at which lines are printed ($f_D=v/d$) where d is the line distance, and n is a whole number.

Each encoder pulse is indicative of unit web displacement ($\rho=d/n$). The relative position of the web at any time is therefore indicated by the number of pulses z generated by the encoder.

Given that the relative distance l equals the distance over which the web has moved during a given period of time, then:

$z=l/\rho$ and, in accordance with the definitions of $l_{AB}$, $l_{AC}$ and $l_{AD}$ above, we can define:

$z_{AB}=z_{A1A2}+z_{A2B2}-z_{B1B2}$
$z_{AC}=$ ... etc.

Thus, by delaying the writing of an image at point $B_1$ by a number of encoder pulses $z_{AB}$ from the writing of an image at $A_1$, it is assured that both images will coincide when being transferred onto the web. This is so irrespective of any variation in linear speed of the paper web, provided that the drums 24a to 24d rotate in synchronism with the displacement of the paper web, as described above.

While the encoder 60 is shown in FIG. 6 as being mounted on a separate roller in advance of the printing stations A to D, we prefer to mount the encoder on one of the drums 24a to 24d, preferably on a central one of these drums. Thus, the web path between the drum carrying the encoder and the drum most remote therefrom is minimised thereby reducing any inaccuracies which may arise from unexpected stretching of the paper web 12, and of variations of $l_{A2B2}$ etc. due to eccentricity of the drums or the rollers defining the wrapping angle ω.

A typical optical encoding device would comprise 650 equally-spaced marks on the periphery of a drum having a diameter of 140 mm in the field of vision of a static optical detection device. With a line distance of about 40 μm, this would generate 1 pulse per 16 lines.

Figure 7:
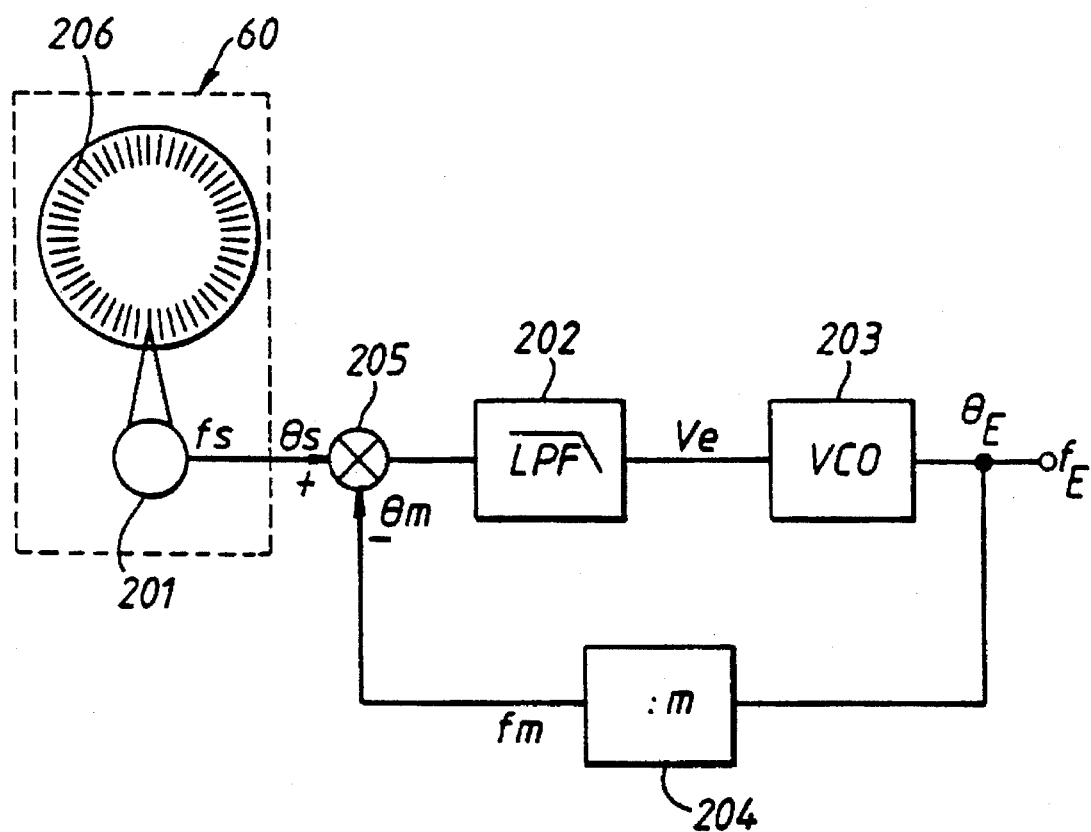
FIG. 7 shows a frequency multiplier circuit for use in a printer according to the invention.

Referring to FIG. 7, there is shown an encoder 60 comprising an encoder disc 206 together with a frequency multiplier circuit. The frequency multiplier circuit, having very good phase tracking performance, multiplies the input encoder sensor frequency $f_s$ by a constant and integer number m. To obtain good register resolution, m is chosen high enough that $f_E=mf_s=nf_D$ thus $f_s=nf_D/m$.

It is necessary that $f_2$ is much less than $f_D$ and it therefore follows that m must be much higher than n.

A voltage controlled oscillator 203 generates a square waveform with a frequency $f_E$. This frequency is divided by m in the divider 204 to a frequency $f_m$, from which $\theta_m$ is compared in phase comparator 205 with the phase $\theta_s$ of the incoming frequency $f_s$ coming from the encoder sensor 201.

A low pass filter 202 filters the phase difference $\theta_s-\theta_m$ to a DC voltage $V_s$ which is fed to the voltage controlled oscillator 203.

With good phase tracking performance, the phase difference between $\theta_s$ and $\theta_m$ approaches zero, so that due to the frequency multiplication, there are m times more phase edges on $f_E$ than between two encoder sensor input phase edges. Every phase edge of $f_E$ represents a web displacement of d/n.

The low pass filter 202 cancels out the high frequency variations in the encoder signal, which are normally not related to web speed variations but to disturbances caused by vibrations.

The time constant of the low pass filter 202 defines the frequency response of the multiplier so as to realise a cut-off frequency of, for example 10 Hz.

Figure 8:
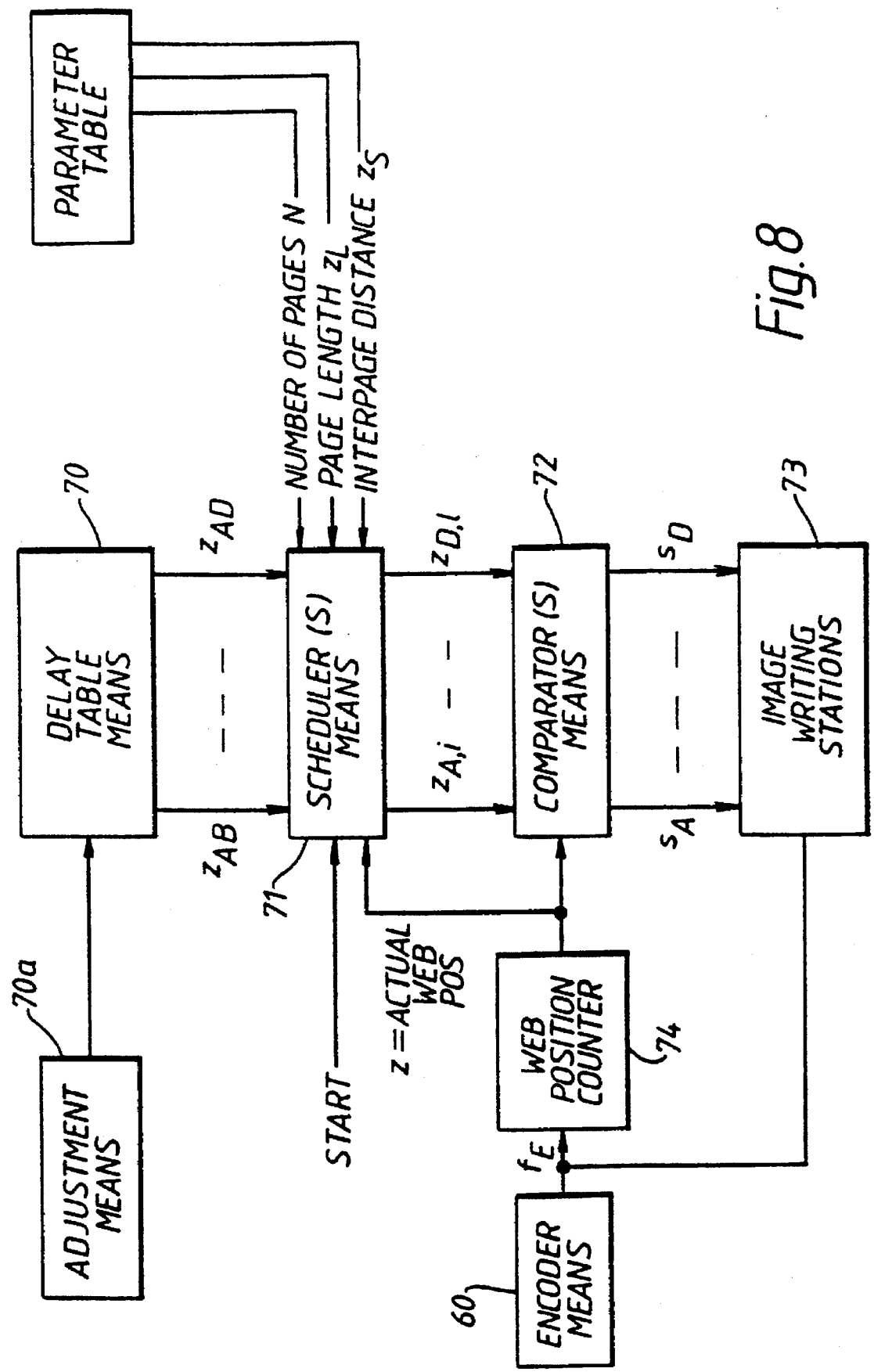
FIG. 8 shows a schematic arrangement of register control means for controlling the registration of images in a printer according to the invention.

Referring to FIG. 8, encoder means 60 generates a signal with frequency $f_E$ being n times higher than the frequency $f_D$ resulting from encoding the time it takes for the web 12 to advance over a distance equal to the line distance d. For a 600 dpi printer (line distance d=42.3 μm), a web speed of 122.5 mm/s results in a frequency $f_D=2896$ Hz.

A web position counter 74 counts pulses derived from the encoder 60 so that at any time, the output of the counter is indicative of a relative web position z, wherein each increment of z denotes a basic web displacement ρ being 1/nth of the line distance d.

In order to calibrate the register means, the operator makes a test print, the print is examined and any misregistration error Δ is measured. A pulse number correction, equal to Δ/ρ is then added or subtracted from the values $z_{AB}$ etc. stored in the delay table 70 by the adjustment means 70a, using methods well known in the art.

Delay table means 70 stores the predetermined values $Z_{AB}$, $Z_{AC}$, $Z_{AD}$ equalling the number of basic web displacements to be counted from the start of writing a first image on drum 24a, at point A1, to the moment the writing of subsequent images on drums 24b, 24c and 24d; at points B1, C1 and D1, so that the position of all subsequent images on the paper web 12 will correspond exactly to the position of the first image.

Scheduler means 71 calculates the values $Z_{A,i}$, $Z_{B,j}$, $Z_{C,k}$ and $Z_{D,l}$; wherein each of these values represent the relative web position at which the writing of the ith, jth, kth and lth image should be started at image writing stations A, B, C and D. Given that values:

N=the number of images to print;

$z_L$=the length of an image expressed as a multiple of basic web displacements; and $z_s$=the space to be provided between two images on paper (also expressed as a multiple of basic web displacement.

The scheduler means can calculate the different values of $Z_{A,i} \ldots \ldots Z_{D,l}$ as follows.

When the START signal (the signal which starts the printing cycle) is asserted, then (assuming the first image is to be started at position $z_0+z_1$, wherein $z_0$ represents the web position at the moment the START signal is asserted) the position as shown in Table 1 occurs:

TABLE 1

| | | | |
|---|---|---|---|
| $z_{A,0} = z_0 + z_1$ | $z_{B,0} = z_0 + z_{AB} + z_1$ | ... | $z_{D,0} = z_0 + z_{AD} + z_1$ |
| $z_{A,1} = z_0 + z_L + z_S + z_1$ | $z_{B,1} = z_{A,1} + z_{AB} + z_1 =$ | ... | $z_{D,1} = z_{A,1} + z_{AD} + z_1 =$ |
| | $z_0 + z_L + z_S + z_{AB} + z_1$ | | $z_0 + z_L + z_S + z_{AD} + z_1$ |
| . | . | | . |
| . | . | | . |
| . | . | | . |
| $z_{A,i} = z_0 + i\,(z_L + z_S) + z_1$ | $z_{B,j} = z_0 + z_{AB} + j\,(z_L + z_S) + z_1$ | ... | $z_{D,l} = z_0 + z_{AD} + l\,(z_L + z_S) + z_1$ |

Comparator means 72 continuously compares the values $z_{A,i} \ldots z_{D,l}$ wherein i,j,k and l start at 0 and stop at N−1, with the value z and, when match(es) are encountered generates signal(s) $s_A$ to $s_D$ after which the respective value(s) i to l are incremented.

Image writing stations 73, upon receipt of the trigger signal(s) $s_A$ to $s_D$, start the writing of the image at image writing station(s) A to D. Once the writing of an image has started, the rest of the image is written with a line frequency $f_D$ derived from $$f_D = f_E/n,$$

the frequency $f_D$ thus being in synchronism with the encoder output, the phase of which is zeroed at the receipt of the trigger signal.

The above described mechanism is of course not restricted to control only the registration of the different images on the paper, but can also be used for generating accurate web-position aware signals for any module in the printer. Examples of such modules are the cutter station 20, the stacker 52, etc (see FIG. 5).

Referring to FIGS. 9A and 9B, when the START pulse initiating the printing cycle is asserted, register 80 stores the sum $z_0+z_1$, as calculated by means of adder 89. Multiplexer 81 feeds this value through to register 82. Adders 85, 86 and 87 then calculate $z^*_{B,j}$, $z^*_{C,k}$ and $z^*_{D,l}$, with j, k and l being zero, being the scheduled web positions at which writing of the first image on the respective image transfer station should start, $z^*_{A,i}$, with i being zero, of course being equal to $z_0+z_1$. After a period of time equal to delay 1, these values are stored in the FIFO (first-in, first-out) memories 90A, 90B, 90C and 90D, of which for simplicity only FIFO 90A is shown. Meanwhile, adders 83 and 84 have calculated $z^*_{A,1}$ being $z^*_{A,0}+z_L+z_s$, and this value is fed through multiplexer 81 to register 82. Again, adders 85, 86 and 87 will then calculate from $z^*_{A,1}$ the values $z^*_{B,1}$, $z^*_{C,1}$ and $z^*_{D,1}$ which are again stored in the FIFO's 90A etc. This process continues until down-counter 88, which started at the value N and decrements with every write pulse storing a next series of values $z^*_{A,i}$ to $z^*_{D,l}$ into the FIFO's, reaches zero. When this has happened, all positions at which writing of an image should start are calculated and stored, in chronological order, in the FIFO memories.

Meanwhile, comparators 91A etc. are continuously comparing the web position z to the values $z_{A,i}$ to $z_{D,l}$, where i to l are initially zero, as read from the FIFO's. When z equals $z_{A,0}$, the signal $s_A$ is asserted, which resets divider 92A (see FIG. 9B), thus synchronising the phase of the $f_D$ signal with the $s_A$ pulse for reasons of increased sub-line registration accuracy as explained above. Also line counter 93A is cleared which addresses line y=0 in the image memory 95A. For every pulse of the $f_D$ signal, pixel counter 94A produces an up-counting series of pixel addresses x. As the image memory is organised as a two-dimensional array of pixels, the counting pixel address x, at the rate specified by the signal PIXEL-CLK, produces a stream of pixel values which are fed to the writing heads 30 resulting in a line-wise exposure of the photoconductive drum surface 26. For every n pulses of the $f_E$ signal, a next line of pixels is fed to the writing heads. In this way the registration of the different images is not only accurate at the beginning of the image, but it also stays accurate within the image.

As soon as the writing of an image has started, the $s_A$ to $s_D$ signals will cause the next $z_{A,i}$ to $z_{D,l}$ value to be read from the FIFO memory 90A etc. so that the next copy of the image will be started as scheduled.

In the more preferred embodiment of the invention shown in FIG. 10, substantial parts of the control circuit are implemented by means of a software program being executed on a microprocessor chip. In this case, all functions offered by the electronic circuit of FIG. 9A, except for the encoder, are replaced by a software code, thereby increasing the flexibility of the control circuit.

The calculated values $z^*_{A,i}$ to $z^*_{D,l}$ are preferably stored in one or more sorted tables 100 in the microprocessor's memory. As in the hardware solution, a comparator means 72 continuously compares the first entry in this list with the web position z as given by a web position counter, which is preferably software but possibly hardware assisted. Upon detection of a match between the two values, the microprocessor asserts the respective signal $s_A$ to $s_D$.

Referring to FIG. 11, in order to correct the period of each individual pulse output from the encoder sensor means, the encoder means produces an additional signal I which acts as an index for the encoder signal P. When the encoder means comprises a disc with a plurality of spaced markings, which are sensed by a first optical sensor, thereby producing pulses that are indicative of web displacement, the signal I is generated by means of a second optical sensor, so that for every revolution of the encoder disc, a single pulse is generated. As such the encoder pulse counter 210 identifies, using the index pulse as a reference, by means of a multi-bit signal, each pulse P produced by the first optical sensor. In the encoder correction table 212, which is preferably contained in some form of non-volatile memory such as a programmable read-only memory (PROM), are stored predetermined multi-bit period time correction values for each of the individual encoder pulses P. In order to allow the encoder correction means to decrease the period time of a certain pulse, such period time correction values are the sum of a positive fixed time and a positive or negative corrective time. Delay means 214 will delay every pulse output from the first encoder sensor by a time equal to the predetermined correction time received from the encoder correction table 212 thus producing a corrected encoder signal $f_s$.

Referring to FIG. 12 there is shown a drum assembly in exploded view. A hollow, cylindrical aluminium drum 234 carries an organic photoconductor surface layer. It is important that the drum surface is centred to have a maximum eccentricity of, for example less than 15 μm. achieve this, the present invention provides a centring method as follows. The hollow drum 234 is provided at each end thereof with an aluminium flange 233, only one of which is shown in FIG. 12 for the sake of clarity. The flange 233 is somewhat over-sized with respect to the internal diameter of the hollow drum 234. The drum assembly is put together by shrink-fitting the flange 233 inside the hollow aluminium drum. Shrink fitting may be achieved by cooling the flange to a temperature of say —20° C. before inserting it into the drum at room temperature. A shaft 231, on which the drum is to be fitted, carries a collar 232, fixed thereon. This collar is sized to fit with some clearance, inside the flange 233, and may be secured thereto by means of three adjustment screws 235, which bear on the collar 232, these screws being angularly displaced by 120°. The assembly is then mounted in the same roller bearings which will be used in the printer into which the drum is to be fitted. The drum assembly is then rotated in these bearings and its eccentricity measured by means well known in the art. By adjustment of the fixing screws 235, the eccentricity can be reduced to a minimum. When this minimum is found, the fixing screws 235 are locked in position, for example by the use of thread sealant.

Cross-reference to co-pending applications

A number of features of the printers described herein are the subject matter of:

co-pending patent application no 93304766.4 entitled "Electrostatographic single-pass multiple-station printer", co-pending patent application no 93304772.2 entitled "An electrostatographic single-pass multiple station printer for duplex printing", co-pending patent application no 93304774.8 entitled "Paper web conditioning apparatus", co-pending patent application no 93304775.5 entitled "Electrostatographic printer for forming an image onto a moving web", all filed on even date herewith.

We claim:

1. A method of forming a drum assembly for use as a rotatable endless surface means onto which a toner image can be formed in an electrostatographic single-pass multiple station printer, said drum assembly comprising a hollow, cylindrical drum having a photoconductive surface layer and, at each end of said drum, a flange and a shaft having a collar fixed thereon which is sized to fit with clearance inside said flange and which is secured thereto by adjustable fixing screws, each of said flanges being over-sized with respect to the internal diameter of said drum, the method comprising:

cooling each of said flanges, inserting the cooled flanges into said drum, and adjusting said fixing screws to minimize the eccentricity of said drum assembly.

2. The method according to claim 1, wherein, after said flanges have been inserted in said drum, said assembly is mounted in bearings and rotated in said bearings to measure the eccentricity of said drum assembly.

3. The method according to claim 2, wherein said drum assembly is subsequently fitted into said printer together with said bearings.

4. The method according to claim 1, wherein said cooling is to a temperature of −20° C.

5. The method according to claim 1, wherein said drum is at room temperature when each said cooled flange is inserted therein.

6. The method according to claim 1, wherein, after said adjusting, said fixing screws are locked in position.

7. The method according to claim 6, wherein said fixing screws are locked in position by means of thread sealant.

8. A drum assembly for a printer comprising:

a hollow drum having first and second axial openings and an outer surface onto which an image can be formed;

first and second flanges inserted in said openings for supporting said drum, each said flange having an axial aperture in the center thereof, and each said flange being in radial compression;

a shaft having a collar fixed in the vicinity of each end thereof, wherein the position of said collars coincides with said flange apertures when said shaft has been positioned within said drum; and means for securing said flanges to said corresponding collars, said securing means being adjustable for reducing the eccentricity of said drum.

9. The drum assembly of claim 8, wherein said securing means comprises two sets of three adjustable fixing screws which bear on said collars.

10. The drum assembly of claim 9, wherein said three fixing screws are angularly displaced from one another by 120°.

11. The drum assembly of claim 9, wherein said three fixing screws are adjusted for concentricity of said drum assembly and locked in place.

12. The drum assembly of claim 8, wherein said drum comprises aluminum.

* * * * *

UNITED STATES PATENT AND TRADEMARK OFFICE
CERTIFICATE OF CORRECTION

PATENT NO. : 5,649,267
DATED : July 15, 1997
INVENTOR(S) : Aerens et al.

It is certified that error appears in the above-identified patent and that said Letters Patent is hereby corrected as shown below:

Column 4, line 24, "p." should read --$\rho$,--;

Column 4, line 43, "40 m" should read --40 $\mu$m"

Column 6, line 31, "50°" should read --5°--;

Column 7, lines 56-57, "endless surface means of station A; line-wise forming an electrostatic toner inage on the" should read --line-wise forming an electrostatic toner image on the endless surface means of station A;--;

Column 11, line 16, "1$_{A1A3}$" should read --1$_{A1A2}$--;

Column 11, line 30, that portion of the equation reading "$\int_0$" should read --$_0\int$--;

Column 12, line 18, "f$_2$" should read --f$_s$--;

Column 12, line 26, "V$_s$" should read --V$_e$--;

Column 13, line 8, "displacement." should read --displacement).--.

Signed and Sealed this

Twenty-fourth Day of March, 1998

*Attest:*

BRUCE LEHMAN

*Attesting Officer*     *Commissioner of Patents and Trademarks*